US010700485B2

(12) United States Patent
Nalin et al.

(10) Patent No.: US 10,700,485 B2
(45) Date of Patent: Jun. 30, 2020

(54) ASSEMBLY COMPRISING BRUSH CAGE AND SPIRAL SPRING, AND CORRESPONDING BRUSH-HOLDER, ELECTRIC MOTOR AND MOTOR VEHICLE STARTER

(71) Applicant: VALEO EQUIPEMENTS ELECTRIQUES MOTEUR, Creteil (FR)

(72) Inventors: Marie-Ange Nalin, Chazey sur Ain (FR); Pierre Mollon, Estrablin (FR); Wilfried Pays, Sermerieu (FR); Maximilien Gentil, Corbas (FR); Alain Bost, L'isle d'abeau (FR)

(73) Assignee: Valeo Equipements Electriques Moteur, Creteil (FR)

( * ) Notice: Subject to any disclaimer, the term of this patent is extended or adjusted under 35 U.S.C. 154(b) by 390 days.

(21) Appl. No.: 15/533,861

(22) PCT Filed: Dec. 10, 2015

(86) PCT No.: PCT/FR2015/053425
§ 371 (c)(1),
(2) Date: Jun. 7, 2017

(87) PCT Pub. No.: WO2016/092223
PCT Pub. Date: Jun. 16, 2016

(65) Prior Publication Data
US 2017/0331242 A1 Nov. 16, 2017

(30) Foreign Application Priority Data

Dec. 12, 2014 (FR) ...................................... 14 62293

(51) Int. Cl.
*H01R 39/38* (2006.01)
*H01R 39/59* (2006.01)
(Continued)

(52) U.S. Cl.
CPC ........... *H01R 39/59* (2013.01); *H01R 39/381* (2013.01); *H01R 39/415* (2013.01); *H02K 5/143* (2013.01);
(Continued)

(58) Field of Classification Search
CPC .... H01R 39/59; H01R 39/381; H01R 39/415; H01R 2201/10; H01R 2201/26; H02K 5/145; H02K 5/148
(Continued)

(56) References Cited

U.S. PATENT DOCUMENTS 7,141,907 B2 * 11/2006 Yang .................... H01R 39/381
310/239
7,145,279 B2 12/2006 Bender
(Continued)

FOREIGN PATENT DOCUMENTS

DE 102004041490 A1 3/2006
DE 102007061745 A1 6/2009
(Continued)

*Primary Examiner* — Jianchun Qin
(74) *Attorney, Agent, or Firm* — Berenato & White, LLC

(57) ABSTRACT

The invention relates mainly to an assembly comprising a brush cage and a spiral spring (36), the spiral spring (36) comprising an axis (Y), a wound part (37) wound about the axis (Y) and an arm (39) extending from one end of the wound part (37), the brush cage comprising at least one lateral wall provided with an opening for the passage of the arm (39) through the lateral wall so that one end of the arm (39) can press against at least part of an end face of a brush, wherein the arm (39) comprises a first portion (391) of which the width (L5) measured along the axis (Y) is different from the width (L6) of the wound part (37) measured along the axis (Y) of the spiral spring (36).

18 Claims, 5 Drawing Sheets

(51) Int. Cl.
*H02K 5/14* (2006.01)
*H01R 39/415* (2006.01)

(52) U.S. Cl.
CPC ............. *H02K 5/145* (2013.01); *H02K 5/148* (2013.01); *H01R 2201/10* (2013.01); *H01R 2201/26* (2013.01)

(58) Field of Classification Search
USPC ........................................................ 310/242
See application file for complete search history.

(56) References Cited

U.S. PATENT DOCUMENTS

2008/0042513 A1  2/2008  Kuenzel et al.
2015/0244130 A1  8/2015  Gentil et al.

FOREIGN PATENT DOCUMENTS

| WO | WO2004051825 A1 | 6/2004 |
| WO | WO2014049289 A1 | 4/2014 |
| WO | WO2014049290 A1 | 4/2014 |

\* cited by examiner

ASSEMBLY COMPRISING BRUSH CAGE AND SPIRAL SPRING, AND CORRESPONDING BRUSH-HOLDER, ELECTRIC MOTOR AND MOTOR VEHICLE STARTER

CROSS-REFERENCE TO RELATED APPLICATIONS AND CLAIM TO PRIORITY

This application is a national stage application of International Application No. PCT/FR2015/053425 filed Dec. 10, 2015, which claims priority to French Patent Application No. 1462293 filed Dec. 12, 2014, the disclosures of which are incorporated herein by reference and to which priority is claimed.

FIELD OF THE INVENTION

The invention relates to an assembly comprising a brush cage and a spiral spring, as well as to the corresponding brush-holder, electric motor and starter. The invention has a particularly advantageous, but non-exclusive application with motor vehicle starters, in particular those installed in vehicles equipped with the function of automatic stopping and restarting of the thermal engine (so-called stop and start function).

BACKGROUND OF THE INVENTION

In a known manner, a brush-holder is fitted on the shaft of the rotor of a starter such as to make the brushes cooperate with an electrical collector which is integral with the rotor shaft. The brush-holder comprises a support plate which supports a set of cages, each of which is used to accommodate a brush. The brushes, which are made of electrically conductive material, permit the electrical supply to the rotor by switching of the electric current in the conductors of the rotor.

For this purpose, each brush comprises a face designed to rub against the conductive strips of the collector which are connected to the rotor winding. A resilient means, such as a spring, exerts on each brush received in a cage a force in the direction of the collector, in order to ensure the contact between the brush and the strips of the collector.

The brushes have alternating polarities. Thus, the brushes with positive polarity are connected electrically, via their respective braid, to an inter-brush connector to which there is also connected electrically the supply wire obtained from the contactor of the starter. In addition, the brushes which are designed for the current return are connected electrically to the earth of the machine by means of their respective braid welded on the plate.

In certain brush-holder configurations, it is known to use a spring of the spiral type comprising a wound part which is fitted on a lug, as well as an arm which extends from an end of the wound part, and is designed to be supported on an end face of the brush opposite the face in contact with the strips of the collector. In order to allow the spring to apply a thrust to the brush, the arm passes by means of an opening provided in a lateral wall of the brush cage.

The problem is to be able to produce springs with a relatively great thrust force, in the knowledge that the diameter of the wound part is limited because of the need to obtain a compact assembly, and that the thickness is also limited in order to be able to use standard springs at a reduced cost. The invention thus proposes to modify the width parameter of the spring in order to adapt its force, without modifying the structure of the brush case, since an increase in the opening to permit the passage of the arm of the spring would make the cage mechanically fragile.

SUMMARY OF THE INVENTION

For this purpose, the invention proposes an assembly comprising a brush cage and a spiral spring:
  the said spiral spring comprising an axis, a part wound around the said axis, and an arm which extends from an end of the said wound part;
  the said brush cage comprising at least one lateral wall provided with an opening for the passage of the said arm through the said lateral wall, such that an end of the said arm can be supported on at least one part of an end face of a brush,
characterised in that the said arm comprises a first portion, the width of which measured according to the said axis is different from the width of the said wound part measured according to the said axis of the said spiral spring.

Thus, the difference in height between a part of the arm and the wound part of the spiral spring makes it possible to de-correlate the functional part of the spring for generation of power relative to the functional part for support on the brush. It is thus possible to maximise the power of the spring, whilst guaranteeing a suitable support area between the end of the arm of the spring and the corresponding face of the brush.

According to one embodiment, the said arm comprises a first portion, the width of which measured according to the said axis is smaller than the width of the said wound part measured according to the said axis of the said spring.

According to one embodiment, the first portion of the said arm is at least the portion of the arm which passes through the said opening in the said lateral wall, between a start of course of the said spring and an end of course of the said spring.

According to one embodiment, the said arm comprises a second portion which extends between the said first portion and the end of the said arm situated in the said brush cage, and the width of the said second portion is greater than the width of the said first portion.

According to one embodiment, the width of the said second portion is equal to the width of the said wound part of the said spring.

According to one embodiment, the said first portion of the said arm has a width of between 4 and 8 mm.

According to one embodiment, the said wound part has a width of 1 mm more than the width of the said first portion of the said arm.

According to one embodiment, the said brush cage comprises a lug which extends outside a receptacle for the said brush, the said wound part of the said spring being fitted around the said lug.

The invention also relates to a brush-holder for an electric motor equipped with an assembly as previously defined.

The invention additionally concerns an electric motor comprising a brush-holder as previously defined.

The invention also relates to a starter for a motor vehicle comprising an electric motor as previously defined.

BRIEF DESCRIPTION OF THE DRAWINGS

The invention will be better understood by reading the following description and examining the figures which accompany it. These figures are provided purely by way of illustration of the invention and in no way limit it.

Elements which are identical, similar or analogous retain the same reference from one figure to another.

DETAILED DESCRIPTION OF THE PREFERRED EMBODIMENT(S)

Figure 1:
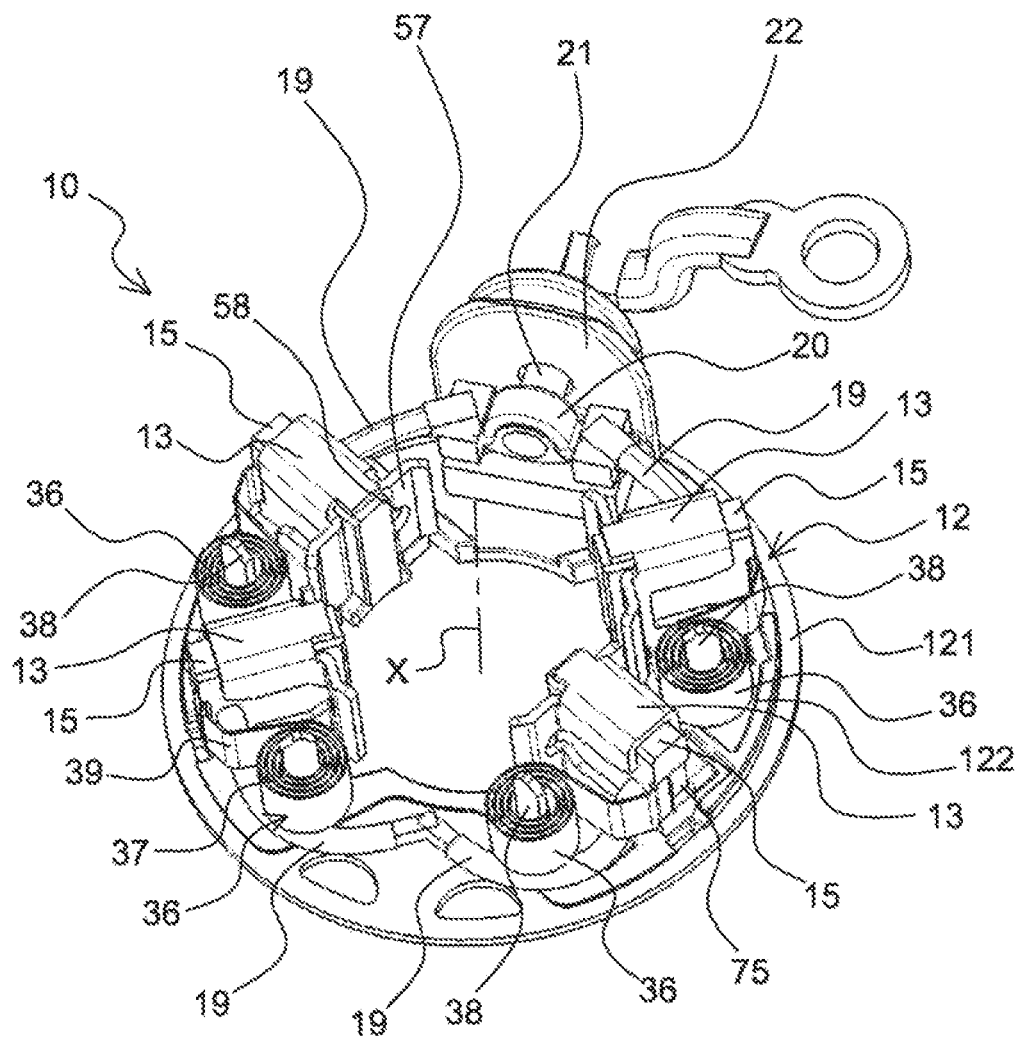
FIG. 1 is a view in perspective of a brush-holder of an electric motor according to the present invention.

FIG. 1 shows a brush-holder 10 according to the invention, which is designed to be used with a motor vehicle starter. This brush-holder 10 comprises a support plate 12 with a substantially annular form, on which there is secured a set of cages 13, each used to accommodate a brush 15. An axis X of the support plate 12 corresponds to the axis of the brush-holder 10.

Figure 2:
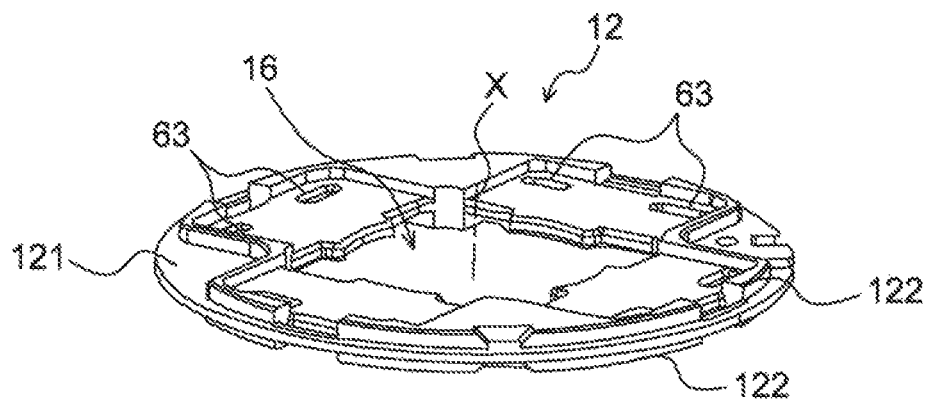
FIG. 2 is a view in perspective of the plate of the brush-holder in FIG. 1.

The support plate 12, which can be seen clearly in FIG. 2, is a part in a single piece comprising a metal plate 121 and over-moulded layers 122 provided on both sides of the metal plate 121. The over-moulded layers 122 are produced by means of a plastic material which ensures good electrical insulation. The over-moulded layers 122 cover all the areas at risk of the plate 12, i.e. all the areas where a short-circuit could occur. The over-moulded layers 122 are sensitive to heat and deformable starting from a predetermined temperature, in order to be able to give rise to a short-circuit in the event of overheating. Typically, the plastic material which is used for the over-moulded layers 122 is a thermoplastic material such as a PA 4.6 or PA 6.6 polyamide or a PSS polypropylene filled with fibres.

The support plate 12 and the cages 13 which it supports are secured on a cover (not represented) forming a rear bearing for the rotor shaft of the electrical machine. In addition, the central part of the plate 12 comprises an orifice 16 by means of which the assembly which it forms together with the brush cages 13 and the brushes 15 is fitted around the shaft of the rotor of the starter.

Each brush 15 is fitted such as to slide inside a cage 13 which is open on the axis X side, in order to allow the brushes 15 to be put into electrical contact with strips supported by a collector of an electrical machine rotor (not represented).

The brushes 15 have alternating polarities. Thus, the brushes 15 with positive polarity are connected electrically, via their respective braid 19, to an inter-brush connector 20, to which there is also connected electrically the supply wire obtained from the contactor of the starter. In this case, the inter-brush connector 20 is connected to the supply wire via a pin 21 which passes through a feed-through sleeve 22 cooperating with the casing of the starter, in order to ensure the sealing of the brush-holder 10.

The positive brushes 15 and their corresponding cages 13 are insulated electrically against the negative polarity for good operation of the starter. This insulation is obtained by means of the over-moulded layers 122. The flexible braids 19 are advantageously made of copper or copper alloy in order to facilitate the welding on the plate 121. The braids 19 can also act as a fuse. In addition, the brushes 15 with negative polarity which are designed for the current return are connected electrically to the earth of the machine by means of their respective braid 19 welded on the plate 121 of the plate 12.

Figure 3A:
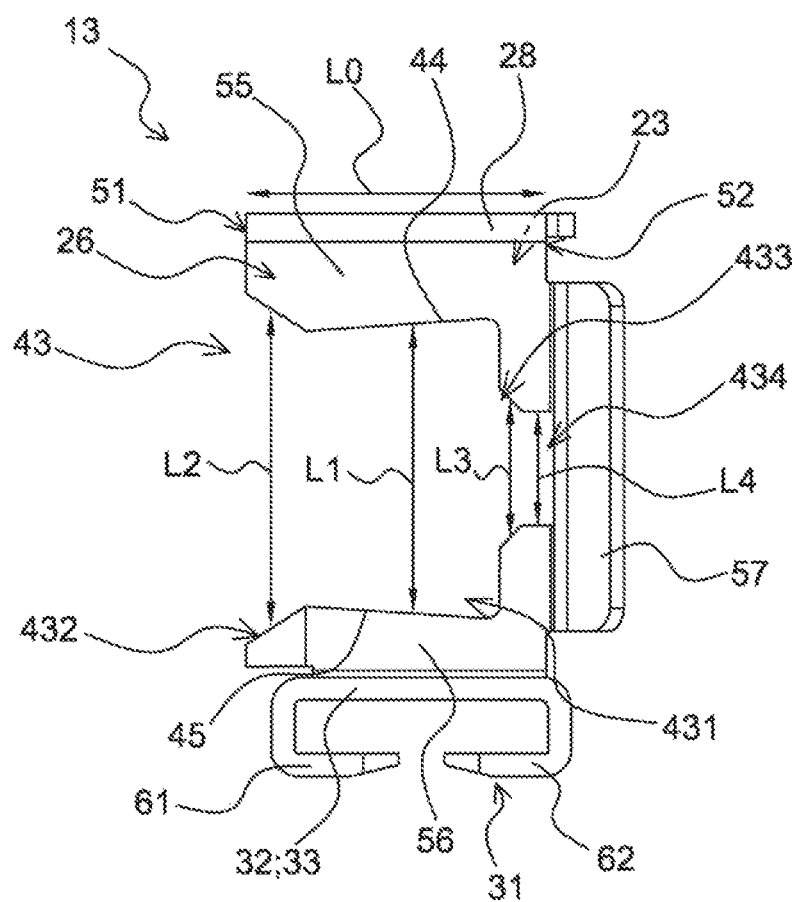
FIGS. 3a to 3c correspond respectively to a side view and two views in perspective according to two different viewing angles, illustrating a first embodiment of a brush cage according to the present invention.
Figure 3B:
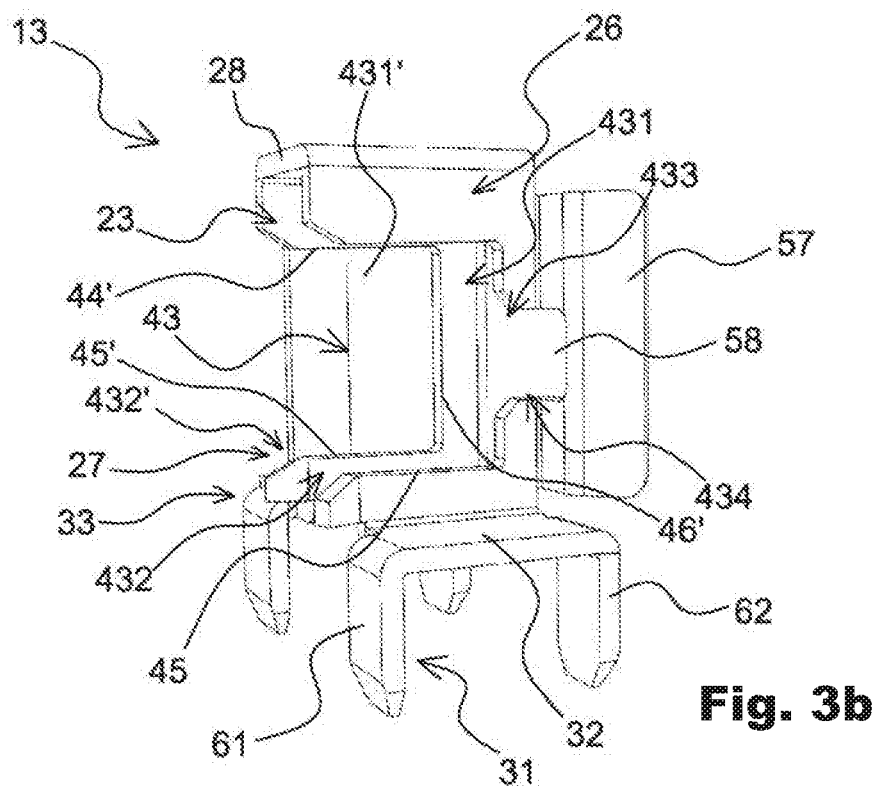
Figure 3C:
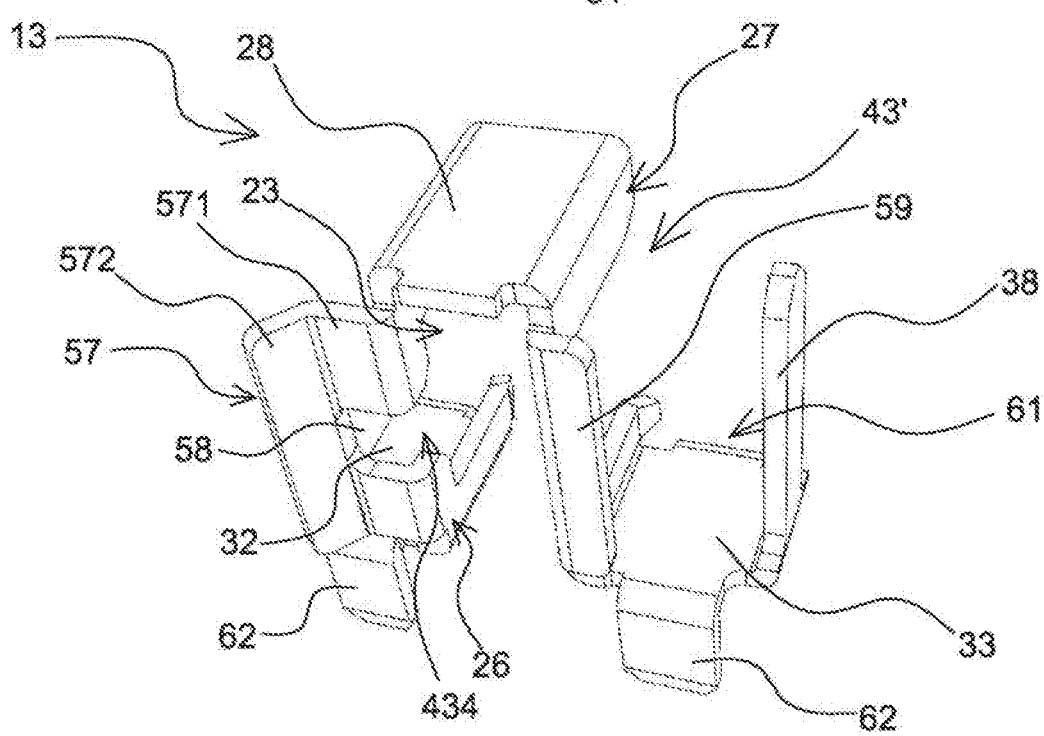

More specifically, as can be seen clearly in FIGS. 3a to 3c, each brush cage 13 has a receptacle 23 for the brush 15 delimited by two parallel opposite lateral walls 26, 27, which are connected to one another by an upper connection wall 28. Each cage 13 is secured on the plate 12 by means of a securing device 31 described in greater detail hereinafter, which belongs to end walls 32, 33 obtained from the lower edges of the lateral walls 26, 27.

In addition, a spiral spring 36 associated with each cage 13 thrusts the corresponding brush 15 radially towards contact strips of the collector. For this purpose, each spring 36 comprises a wound part 37 fitted around a lug 38 which extends axially relative to the axis X, as well as an arm 39 which is designed to be supported against a face of the brush 15 opposite the face which is in contact with the strips of the collector. The lug 38, which extends outside the receptacle 23 of the brush 15, is in this case obtained by bending one of the end walls 32, 33 of each cage 13.

As can be seen clearly in FIG. 3a, the lateral wall 26 comprises an opening 43 for the passage of the arm 39 of the spring 36. This lateral wall 26 has a length L0, measured in a direction perpendicular to the axis X, between a first end 51 which is further from the collector, and a second end 52 which is closer to the collector (situated on the side opposite the arm 39 of the spring).

The opening 43 comprises at least one first portion 431 between the two ends 51, 52, which widens going towards the second end 52, i.e. the width L1 of this first portion 431 measured according to the axis X increases when going towards the second end 52. This first portion 431 of the opening 43 comprises two opposite edges 44, 45 provided on the lateral wall 26. One of the edges 44 is inclined relative to the connection wall 28, and the second edge 45 is also inclined in the opposite direction relative to the direction of inclination of the first edge 44, in order to form the widening. As a variant, a single one of the two edges 44, 45 is inclined in order to form the widening.

The opening 43 also comprises a second portion 432, which extends between the first end 51 and the first portion 431. This second portion 432 widens going towards the first end 51, i.e. the width L2 of this second portion 432 measured according to the axis X increases when going towards the first end 51. This second portion 432 makes it possible to facilitate the insertion and centring of the arm 39 of the spring 36.

The opening 43 comprises a third portion 433, which extends between the second end 52 and the first portion 431. This third portion 433 widens going towards the first end 51, i.e. the width L3 of this third portion 433 measured according to the axis X increases when going towards the first end 51. This third portion 433 makes it possible to facilitate the insertion of the braid 19 of the brush 15 during its displacement towards the collector caused by the wear of the brush 15.

The opening 43 comprises a fourth portion 434 which extends between the second end 52 and the third portion 433. This fourth portion 434 is delimited by parallel edges of the wall 26. In other words, this fourth portion 434 has a width L4 measured according to the axis X which is substantially constant. The edges of this portion 434 separate two dividers 55, 56 which form the wall 26. These two dividers 55, 56, which are globally in the form of an "L", are connected to one another by a fin 57.

In order to increase the rigidity of the cage 13, the fin 57 comprises two parts 571, 572 extending on two different planes which are inclined relative to one another, as can be seen clearly in FIG. 3c. It should be noted that the fourth portion 434 of the opening 43 can be extended in a notch 58 which is provided in the fin 57, in order to permit the passage of the braid 19 of the brush 15 accommodated in the corresponding cage 13 as close as possible to the collector.

As can be seen in FIG. 3b, the other lateral wall 27 has an opening 43' comprising a first portion 431' and a second portion 432' with a configuration which is similar respectively to the first portion 431 and to the second portion 432 of the opening 43. In this case, the inclined edges 44' and 45' provided in the wall 27 are connected to one another by an edge 46' with an orientation parallel to the axis X. In other words, the lateral wall 27 is formed by two dividers which are connected to one another on the collector side by a strip of material which extends on the plane of the wall 27. As a variant, a single one of the two edges 44' and 45' is inclined. On the side of the face of the brush 15 which opens onto the side of the collector, a fin 59 is obtained from an edge of the wall 27 in order to strengthen the cage 13 mechanically.

As illustrated in FIG. 1, it will be possible to position the braid 19 of the brush 15 and the arm 39 of the corresponding spring 36 on the same side of the cage 13, for the brushes with negative polarity, the braid 19 of which is welded onto the plate 121. The braid 19 and the arm 39 are in this case positioned on the side of the wall 26 comprising the open portions 431, 432 which permit the passage of the arm 39 of the spring 36, as well as the open portions 433, 434 which permit the passage of the braid 19.

In addition, for the brushes 15 with positive polarity which have their braid 19 welded onto the interconnector 20, the arm 39 of the spring 36 and the braid 19 are positioned respectively on both sides of the brush 15. In this case, the spring 36 is positioned on the side of the wall 27, such that its arm 39 passes through the portions 431', 432' of the opening 43', whereas the braid 19 is positioned on the side of the wall 26, in order to be able to pass at the end of the course of the spring 36 via the open portions 433, 434, as well as via the notch 58 in the fin 57, in order for the braid 19 to be able to be displaced as close as possible to the collector so as to maximise the volume of use of the brush 15.

Figure 4:
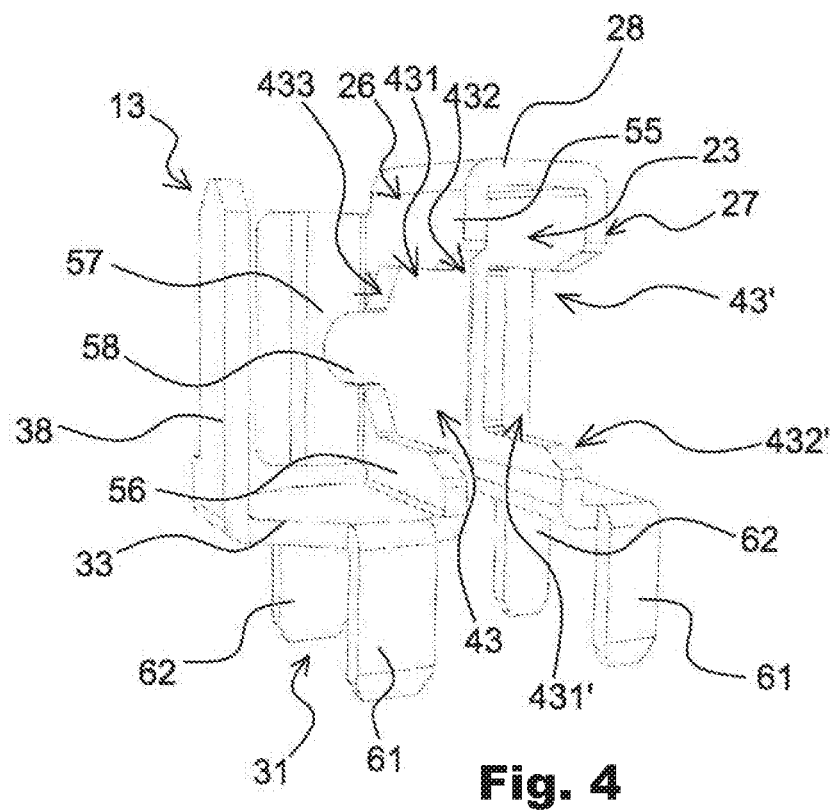
FIG. 4 is a view in perspective illustrating a second embodiment of a brush cage according to the present invention.

As a variant, as represented in FIG. 4, the opening 43 in the wall 26 is without a fourth portion 434, with the third portion 433 being extended directly into the notch 58 provided in the fin 57. In this case, the opening 43 separates two dividers 55, 56 in the form of an "L" which are connected to one another by the fin 59. The lateral wall 27, provided with its opening 43' and two corresponding portions 431' and 432' is similar to that of the embodiment in FIGS. 3a to 3c.

Figure 5:
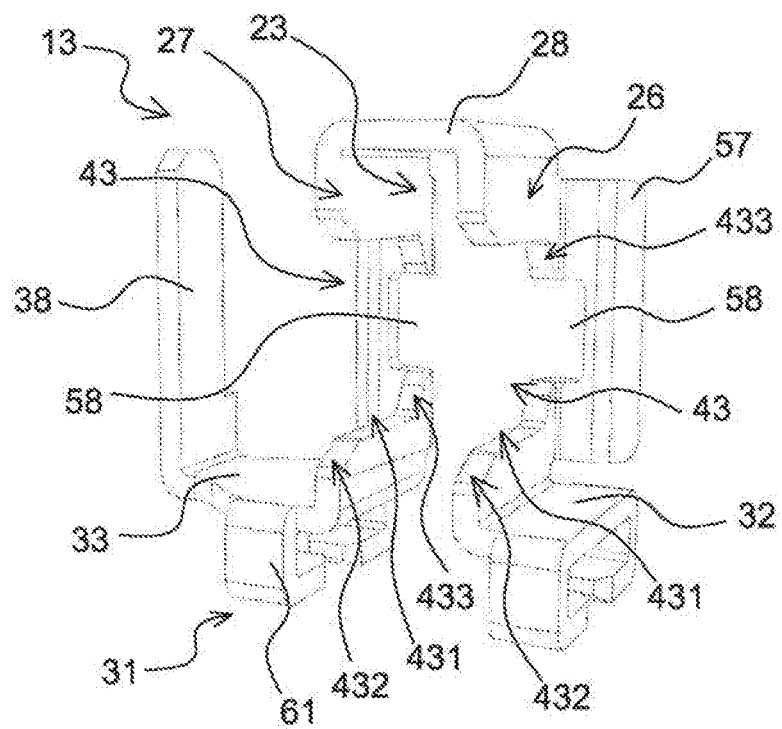
FIG. 5 is a view in perspective illustrating a third embodiment of a brush cage according to the present invention.

As a variant, as represented in FIG. 5, the two walls 26, 27 are symmetrical, and have identical openings 43, with a first portion 431, a second portion 432 and a third portion 433 which extend into a notch 58 provided in the corresponding fin 57, 59, as in the embodiment in FIG. 4.

In addition, the system for securing on the plate 12 is formed by two pairs of legs 61, 62. The legs 61, 62 of each pair are obtained from two opposite edges of the end walls 32, 33. A leg 61 of each pair is designed to pass through the plate 12 from one side to the other via a hole 63 provided according to its thickness (cf. FIG. 2). The other leg 62 of each pair is supported against a side of the inner contour which delimits the orifice 16. As shown in FIGS. 3a and 5, the legs 61, 62 of each pair are designed to be folded back towards one another against the plate 12. Alternatively, the securing system 31 comprises at least one rivet which passes through the plate 12, and an end wall 32, 33 of the brush cage 13. According to one embodiment, each cage 13 can be obtained by bending a thin small metal plate, such as to form substantially an omega, the end branches of which are secured on the plate 12.

Preferably, the holes 63 which receive the legs 61, 62 of the cages 13 with negative polarity, as well as the areas of the plate 12 which are in contact with the cages 13 receiving the brushes 15 with negative polarity, are not insulated electrically, such that an electrical contact can intervene between the cages 13 with negative polarity and the plate 121 via the legs 61, 62. This contact is not detrimental to the operation of the starter, since it participates in the establishment of the electrical contact between the parts which are designed to be at the same electrical potential, in this case the potential of the earth in this application.

Figure 6A:
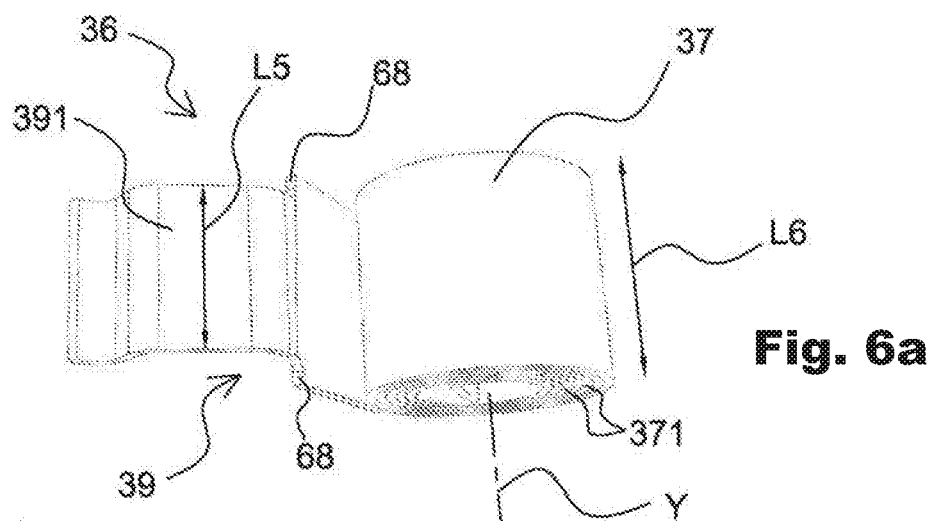
FIGS. 6a to 6c are views in perspective illustrating the three different embodiments of a spiral spring according to the present invention.
Figure 6B:
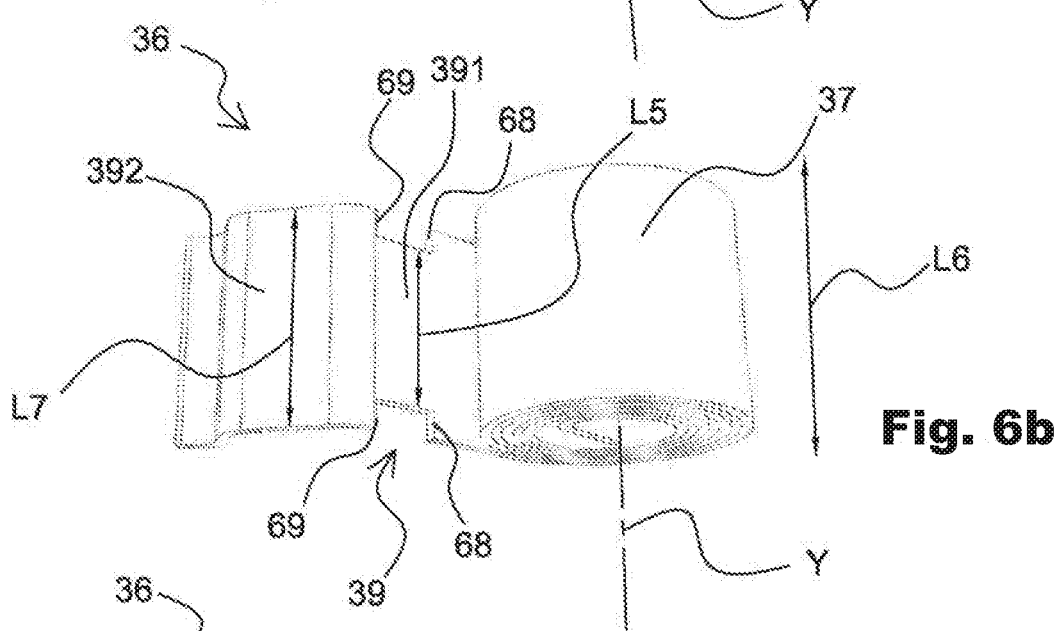
Figure 6C:
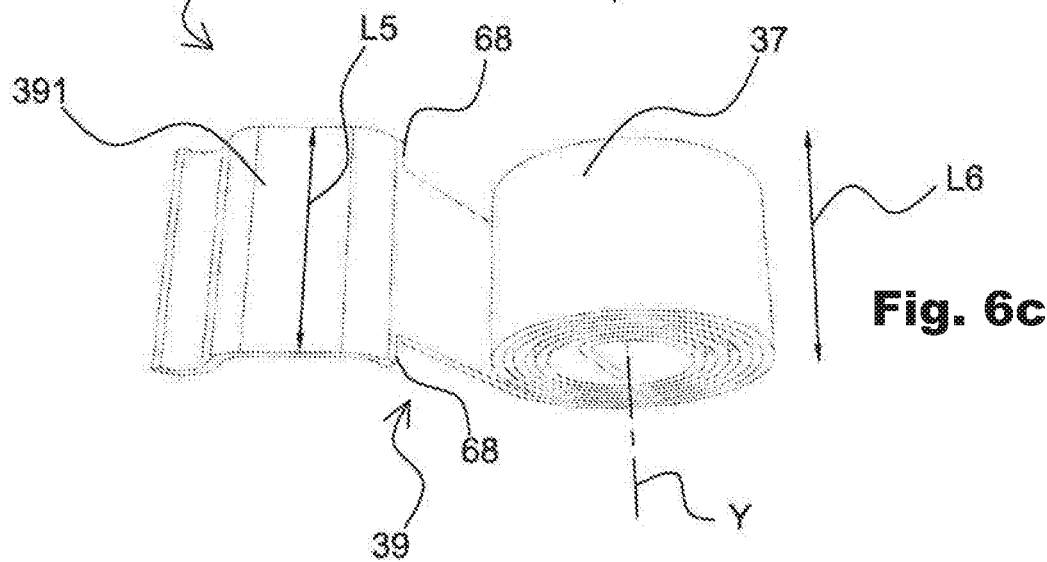

As can be seen clearly in FIGS. 6a to 6c, the wound part 37 of the spring 36 is formed by a plurality of concentric turns 371 wound around an axis Y and axially coinciding with one another. The arm 39 extends from an end of the wound part 37 which is fitted around the lug 38. The arm 39 is designed to be supported against the rear face of the brush 15 opposite the face of the brush 15 which is supported against the strips of the collector. As best shown in FIGS. 6a-6c, each of the concentric turns 371 of the wound part 37 of the spring 36 according to the exemplary embodiments of the present invention has a width L6 measured along the axis Y. Therefore, as the turns 371 forming the wound part 37 of the spring 36 are concentric, the wound part 37 has the width L6 measured along the axis Y.

In the embodiment in FIG. 6a, the arm 39 comprises a portion 391, a width L5 of which measured along the axis Y is smaller than the width L6 of the wound part 37 measured along the axis Y. Moreover, the width (L5) of the first portion (391) is smaller (i.e., different) from the width L6 of each of the concentric turns (371) of the wound part 37 of the spring 36 measured along the axis (Y). This portion 391 is delimited by two setbacks 68 obtained from the part of the arm 39 which has a width identical to the width L6 of the wound part 37, and extends towards the interior of the strip of material of the arm 39.

This portion 391 of the arm 39 with a reduced width is at least equal to the length of the portion of the arm 39 which passes through the opening 43 in the lateral wall 26, between the start of the course of the spring 36, and the end of the course of the spring 36. It should be noted at this point that the start of the course of the spring 36 corresponds to the position of the arm 39 of the spring 36 for a brush 15 at the start of its service life with a maximum length, whereas the end of the course of the spring 36 corresponds to a position of the arm 39 of the spring 36 for a brush 15 at the end of its service life, with a minimum length. In this case, the portion 391 extends as far as the end of the arm 39 situated in the cage 13 which is supported against the brush 15.

In the embodiment in FIG. 6b, the portion 391 with a reduced width is substantially equal to the length of the portion of the arm 39 which passes through the opening 43 in the lateral wall 26, between the start and end of course of the spring 36. In this case, the arm 39 can comprise a second portion 392, which extends between the first portion 391 and the end of the arm 39 which is situated in the cage 13. The width L7 of the second portion 392 is greater than the width L5 of the first portion 391. In this case, although it can be different, the width of the second portion 392 is equal to the width L6 of the wound part 37. The portion 392 is delimited at one of its ends by the two setbacks 68, and at the other side by two other similar setbacks 69 situated between the first 391 and second 392 portions.

According to a particular embodiment, the first portion 391 has a width L5 of between 4 and 8 mm. The wound part 37 has a width L6 of 1 mm more than the width L5 of the first portion 391. The metal strip which forms the spiral spring 36 has a thickness of between 0.25 and 0.7 mm. The diameter of the wound part 37 is approximately 10 mm. It will be appreciated that these dimensions can vary according to the application.

Even if in most cases the wound part 37 is wider than the portion 391 of the arm 39 which passes through the opening 43 in order to maximise the power of the spring 36, in certain embodiments which impose stringent size constraints, the arm 39 of the spring 36 has a portion 391 with a width L5 which is greater than the width L6 of the wound part 37, as illustrated in FIG. 6c. A configuration of this type allows the arm 39 to adapt to the area of support with the brush 15, whilst allowing the spring 36 to have a reduced volume. In this case, the setbacks 68 extend from the part of the arm 39 with the same width as the wound part 37, towards the exterior of the strip of material which forms the spring 36.

As a variant, the end of the arm 39 of the spring 36 is supported only against a part of the end face. This part can correspond for example to the base of a groove 75 which makes it possible to facilitate the guiding of the arm 39 of the spring 36 during its displacement, as illustrated in FIG. 1.

It will be appreciated that persons skilled in the art will be able to modify the configuration of the brush-holder 10 previously described, without departing from the context of the invention defined hereinafter by the claims.

Thus, in particular as a variant, the brush-holder 10 comprises more than four brushes 15, with each brush-holder 15 being able to be associated for example with another brush positioned on the opposite side of the plate 12.

In this case, the brush-holder 10 is a brush-holder of an electric motor of a motor vehicle starter. As a variant, the brush 10 could also belong to an alternator or to an alternator-starter.

The invention claimed is:

1. An assembly comprising:
    a brush cage (13); and
    a spiral spring (36);
    the spiral spring (36) comprising an axis (Y), a wound part (37) wound around the axis (Y), and an arm (39) extending from an end of the wound part (37);
    the brush cage (13) comprising at least one lateral wall (26, 27) provided with an opening (43) for the passage of the arm (39) through the at least one lateral wall (26, 27) such that a distal end of the arm (39) supported on at least one part of an end face of a brush (15),
    the arm (39) comprising a first portion (391), a width (L5) of the first portion (391) measured along the axis (Y) is different from a width (L6) of the wound part (37) measured along the axis (Y) of the spiral spring (36),
    the wound part (37) of the spring (36) formed by a plurality of concentric turns (371) around the axis (Y),
    the width (L5) of the first portion (391) is different from a width of each of the concentric turns (371) of the wound part 37 of the spring 36 measured along the axis (Y).

2. The assembly according to claim 1, wherein the width (L5) of the first portion (391) measured along the axis (Y) is smaller than the width (L6) of the wound part (37) measured along the axis (Y) of the spiral spring (36).

3. The assembly according to claim 2, wherein the first portion (391) of the arm (39) is at least a portion of the arm which passes through the opening (43) in the at least one lateral wall (26, 27), between a start of the spring (36) and an end of the spring (36).

4. The assembly according to claim 2, wherein the arm (39) comprises a second portion (392) which extends between the first portion (391) and the end of the arm (39) situated in the brush cage (13), and wherein a width (L7) of the second portion (392) is greater than the width (L5) of the first portion (391).

5. The assembly according to claim 2, wherein the width (L5) of the first portion (391) of the arm (39) is between 4 and 8 mm.

6. The assembly according to claim 1, wherein the first portion (391) of the arm (39) is at least a portion of the arm which passes through the opening (43) in the at least one lateral wall (26, 27) between a start of the spring (36) and an end of the spring (36).

7. The assembly according to claim 6, wherein the arm (39) comprises a second portion (392) which extends between the first portion (391) and the end of the arm (39) situated in the brush cage (13), and wherein a width (L7) of the second portion (392) is greater than the width (L5) of the first portion (391).

8. The assembly according to claim 6, wherein the width (L5) of the first portion (391) of the arm (39) is between 4 and 8 mm.

9. The assembly according to claim 1, wherein the arm (39) comprises a second portion (392) which extends between the first portion (391) and the distal end of the arm (39) situated in the brush cage (13), and wherein a width (L7) of the second portion (392) is greater than the width (L5) of the first portion (391).

10. The assembly according to claim 9, wherein the width (L7) of the second portion (392) is equal to the width (L6) of the wound part (37) of the spring (36).

11. The assembly according to claim 10, wherein the width (L5) of the first portion (391) of the arm (39) is between 4 and 8 mm.

12. The assembly according to claim 9, wherein the width (L5) of the first portion (391) of the arm (39) is between 4 and 8 mm.

13. The assembly according to claim 1, wherein the width (L5) of the first portion (391) of the arm (39) is between 4 and 8 mm.

14. The assembly according to claim 1, wherein the width (L6) of the wound part (37) is 1 mm more than the width (L5) of the first portion (391) of the arm (39).

15. The assembly according to claim 1, wherein the brush cage (13) comprises a lug (38) which extends outside a receptacle (23) for the brush (15), and wherein the wound part (37) of the spring (36) is fitted around the lug (38).

16. A brush-holder (10) for an electric motor comprising an assembly as defined by claim 1.

17. An electric motor comprising a brush-holder (10) as defined by claim 16.

18. A starter for a motor vehicle comprising an electric motor as defined by claim 17.

* * * * *